(12) United States Patent
Kapinos et al.

(10) Patent No.: US 11,934,368 B2
(45) Date of Patent: Mar. 19, 2024

(54) CATEGORIZING ENCRYPTED DATA FILES

(71) Applicant: LENOVO (Singapore) PTE. LTD., New Tech Park (SG)

(72) Inventors: Robert J. Kapinos, Durham, NC (US); Scott W. Li, Cary, NC (US); Robert J. Norton, Raleigh, NC (US); Russell Speight VanBlon, Raleigh, NC (US)

(73) Assignee: LENOVO (Singapore) PTE. LTD., New Tech Park (SG)

( * ) Notice: Subject to any disclaimer, the term of this patent is extended or adjusted under 35 U.S.C. 154(b) by 345 days.

(21) Appl. No.: 16/796,585

(22) Filed: Feb. 20, 2020

(65) Prior Publication Data
US 2021/0263904 A1    Aug. 26, 2021

(51) Int. Cl.
*G06F 16/22*  (2019.01)
*G06N 5/04*  (2023.01)
*G06N 20/00*  (2019.01)
*H04L 9/06*  (2006.01)

(52) U.S. Cl.
CPC ........... *G06F 16/2228* (2019.01); *G06N 5/04* (2013.01); *G06N 20/00* (2019.01); *H04L 9/0618* (2013.01)

(58) Field of Classification Search
CPC ...... G06F 16/2228; G06N 20/00; G06N 5/04; H04L 9/0618
See application file for complete search history.

(56) References Cited

U.S. PATENT DOCUMENTS

| | | | |
|---|---|---|---|
| 8,213,607 B2 * | 7/2012 | Rose | H04L 9/0662 713/168 |
| 2010/0223314 A1 * | 9/2010 | Gadel | H04L 51/58 709/200 |
| 2014/0330836 A1 * | 11/2014 | Parashar | G06F 16/901 707/769 |
| 2016/0078245 A1 * | 3/2016 | Amarendran | G06N 20/00 713/193 |
| 2018/0337788 A1 * | 11/2018 | Gajek | H04L 9/14 |
| 2019/0199521 A1 * | 6/2019 | Sayers | H04L 9/0819 |
| 2019/0363877 A1 * | 11/2019 | Figueira | H04L 9/0869 |
| 2020/0201789 A1 * | 6/2020 | Durham | G06F 21/602 |

\* cited by examiner

*Primary Examiner* — Mariela Reyes
*Assistant Examiner* — Courtney Harmon
(74) *Attorney, Agent, or Firm* — Kunzler Bean & Adamson; Bruce R. Needham (57) ABSTRACT

For categorizing encrypted data files, a processor determines a block cipher key length for a data file based on data file contents. The processor encrypts the data file with an encryption cipher using the block cipher key length. The processor further determines a data type for the encrypted data file from macroscopic artifacts of the encrypted data file.

20 Claims, 8 Drawing Sheets

| Encrypted Data File 125 | Data Type 130 |
| --- | --- |
| Encrypted Data File 125 | Data Type 130 |
| Encrypted Data File 125 | Data Type 130 |
| ⋮ | |
| Encrypted Data File 125 | Data Type 130 |

FIG. 2A

| Encryption Type Model 160 |
| --- |

| Macroscopic Artifact 225 | Data Type 130 |
| --- | --- |
| ⋮ | |
| Macroscopic Artifact 225 | Data Type 130 |

| Data File Length 205 |
| Data File Contents 207 |
| Protected Element Size 209 |
| Block Cipher Key Length 210 |
| Encryption Cipher 215 |
| Target Entropy 220 |
| Cipher Key 230 |

CATEGORIZING ENCRYPTED DATA FILES

FIELD

The subject matter disclosed herein relates to categorizing data files and more particularly relates to categorizing and/or indexing encrypted data files.

BACKGROUND

Data files are often encrypted when stored.

BRIEF SUMMARY

An apparatus for categorizing encrypted data files is disclosed. The apparatus includes a processor and a memory. The processor determines a block cipher key length for a data file based on data file contents. The processor encrypts the data file with an encryption cipher using the block cipher key length. The processor further determines a data type for the encrypted data file from macroscopic artifacts of the encrypted data file. A method and program product also perform the functions of the apparatus.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be written in any combination of one or more programming languages including an object oriented programming language such as Python, Ruby, R, Java, Java Script, Smalltalk, C++, C sharp, Lisp, Clojure, PHP, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise. The term "and/or" indicates embodiments of one or more of the listed elements, with "A and/or B" indicating embodiments of element A alone, element B alone, or elements A and B taken together.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Figure 1:
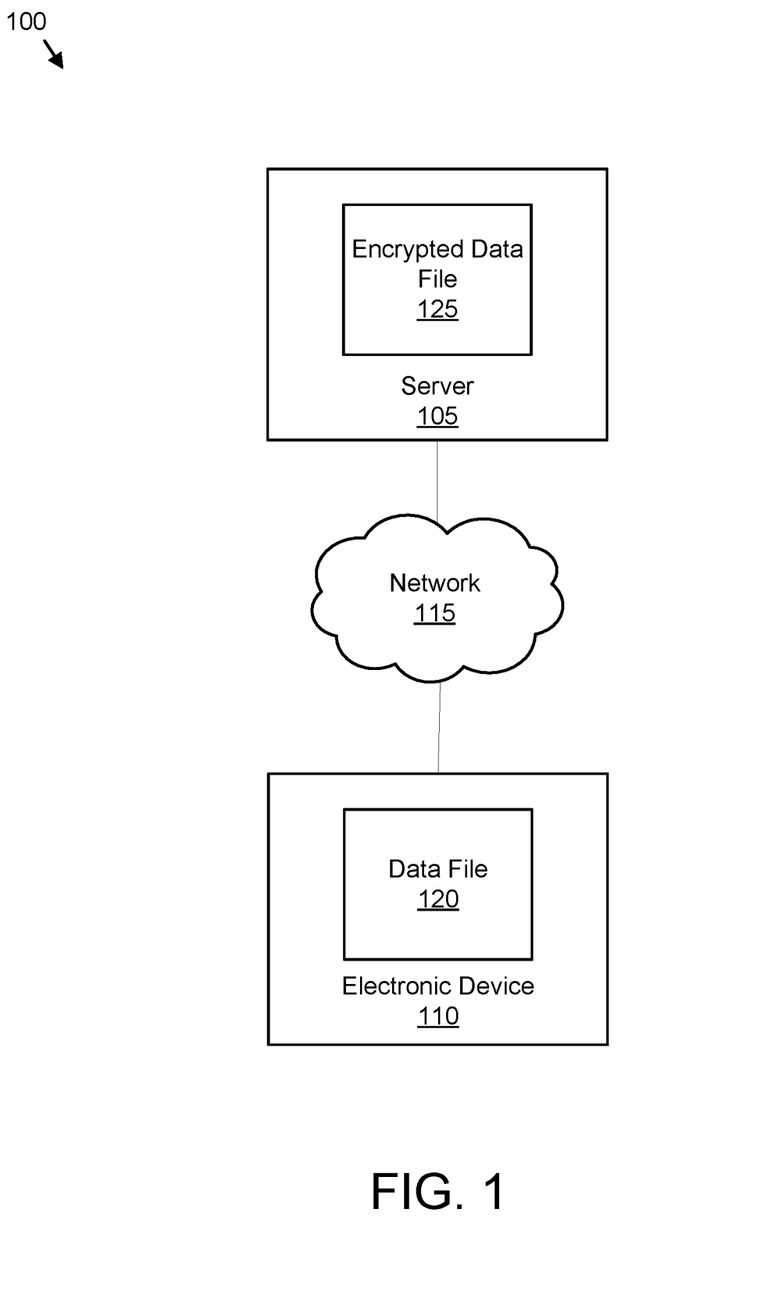
FIG. 1 is a schematic block diagram illustrating one embodiment of a cloud storage system.

FIG. 1 is a schematic block diagram illustrating one embodiment of a cloud storage system 100. The system 100 may store data files 120 for electronic devices 110. In the depicted embodiment, the system 100 includes a server 105, the electronic device 110, and a network 115. The network 115 may include the Internet, a mobile telephone network, a Wi-Fi network, a wide-area network, a local area network, or combinations thereof. The electronic device 110 may communicate with the server 105 via the network 115.

The electronic device 110 may upload data files 120 to the server 105. The data files 120 may be encrypted as encrypted data files 125 to protect the content of the data files 120 during transmission to the server 105 and/or during storage by the server 105. In addition, the server 105 may be unable to decrypt the encrypted data files 125 to further protect the content of the encrypted data files 125.

Unfortunately, because the data files 120 are encrypted as encrypted data files 125, many operations cannot be performed on the encrypted data files 125 by the server 105. For example, the server 105 may be unable to categorize, filter, and/or search the encrypted data files 125.

The embodiments determine a data type for the encrypted data files 125 from macroscopic artifacts of the encrypted data files 125. As a result, many operations including but not limited to categorizing, indexing, filtering, and/or searching may be performed on the encrypted data files 125 based on the data type as will be described hereafter.

In addition, the embodiments may determine an encryption cipher and/or block cipher key length. An appropriate block cipher key length and/or block cipher preserves the macroscopic artifacts and global file structure for the data file 120 while concealing any details of the data file 120 and destroying the data file's utility. In one embodiment, encrypted blocks of the encrypted data files 125 have defined, fixed length boundaries.

Figure 2A:
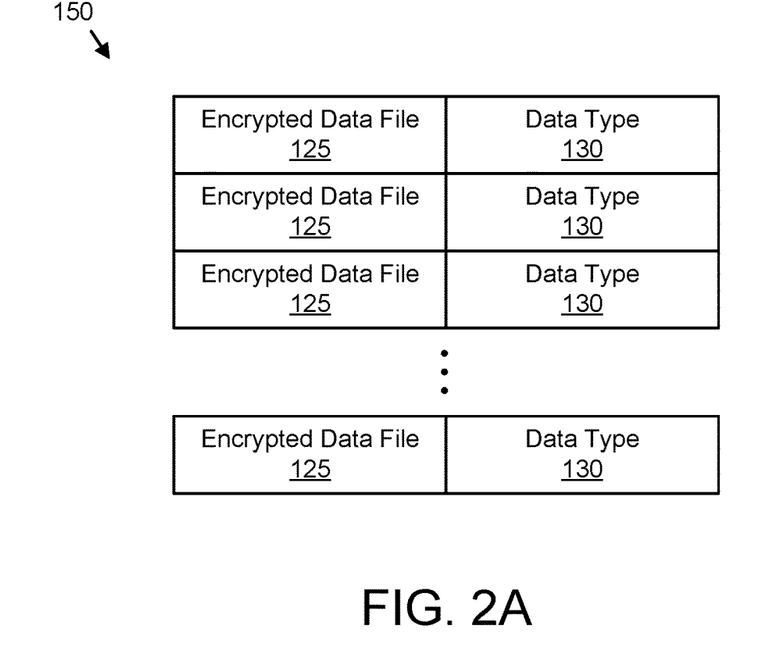
FIG. 2A is a schematic block diagram illustrating one embodiment of training data.

FIG. 2A is a schematic block diagram illustrating one embodiment of training data 150. The training data 150 may be used to train an encryption type model. The training data 150 may be organized as a data structure in a memory. In the depicted embodiment, the training data 150 includes a plurality of encrypted data files 125 and corresponding data types 130. Each data type 130 may comprise a file type, a file content class, and/or an image class for the corresponding encrypted data file 125. In one embodiment, the training data 150 is used for supervised training of the encryption type model 160.

In one embodiment, the training data 150 is generated from a plurality of data files 120. A data type 130 is determined for each data file 120 and the data file 120 is encrypted as the encrypted data file 125. The encrypted data file 125 and corresponding data type 130 is stored in the training data 150.

Figure 2B:
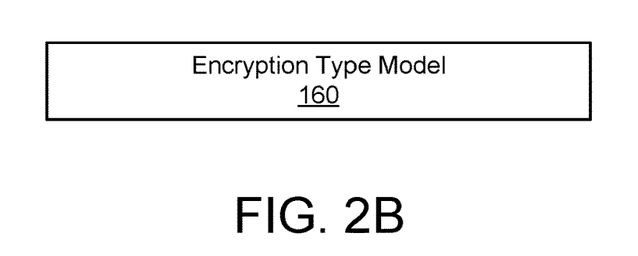
FIG. 2B is a schematic block diagram illustrating one embodiment of an encryption type model.

FIG. 2B is a schematic block diagram illustrating one embodiment of the encryption type model 160. The encryption type model 160 may be embodied in a neural network. The encryption type model 160 is used to determine the data type 130 for the encrypted data files 125 as will be described hereafter.

Figure 2C:
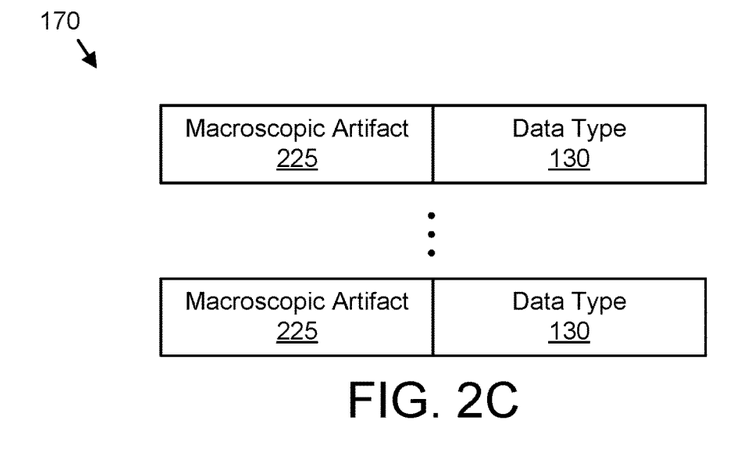
FIG. 2C is a schematic block diagram illustrating one embodiment of macroscopic artifacts data.

FIG. 2C is a schematic block diagram illustrating one embodiment of macroscopic artifacts data 175. The macroscopic artifacts data 175 may be organized as a data structure in a memory. The macroscopic artifacts data 175 may include a plurality of macroscopic artifacts 225 and corresponding data types 130. In one embodiment, the macroscopic artifacts 225 comprises one or more examples of artifacts in encrypted data files 125.

In one embodiment, the macroscopic artifacts 225 are identified for encrypted data files 125 with known data types 130. The macroscopic artifacts 225 may be identified from repeated patterns for a plurality of encrypted data files 125 with the same data type 130.

Figure 3:
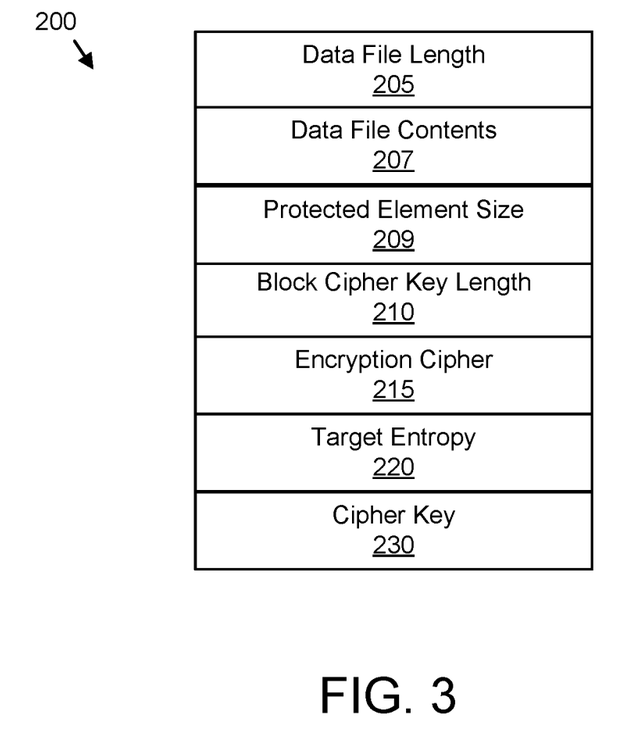
FIG. 3 is a schematic block diagram illustrating one embodiment of encryption data.

FIG. 3 is a schematic block diagram illustrating one embodiment of encryption data 200. The encryption data 200 may be used to encrypt the data file 120. The encryption data 200 may be organized as a data structure in a memory. In the depicted embodiment, the encryption data 200 includes a data file length 205, data file contents 207, a protected element size 209, a block cipher key length 210, an encryption cipher 215, a target entropy 220, and a cipher key 230.

The data file length 205 may indicate a length of a data file 120. The data file length 205 may be measured in bytes. The data file contents 207 comprise the contents of the data file 120. The protected element size 209 may describe a size of a largest element in the data file contents 207 that is protected by the encryption. In one embodiment, the protected element size 209 may describe a size of encrypted blocks in the encrypted data file 125. Each element of the data file 120 and/or encrypted data file 125 may be the protected element size 209.

The block cipher key length 210 specifies the length of the encryption cipher 215 and/or cipher key 230 that are used to encrypt the data file 120 as the encrypted data file 125. In one embodiment, the block cipher key length 210 is based on the data file length 205 and/or target entropy 220.

The block cipher key length 210 may be long enough to protect the secrets of the data file 120. In one embodiment, a block cipher key length 210 of at least three times a largest secret size is sufficient. The block cipher key length 210 may also be short enough to preserve macroscopic patterns and/or macroscopic artifacts 225 of the data file 120 and/or encrypted data file 125. For example, the block cipher key length 210 may be 1000 times or less shorter than the data file length 205. In addition, the block cipher key length 210 may have sufficient bits to support strong encryption of the data file 120.

The encryption cipher 215 indicates the cipher that is used to encrypt the data file 120 as the encrypted data file 125 such as Advanced Encryption Standard (AES), Rivest Cipher 5 (RC5), Data Encryption Standard (DES). In one embodiment, the cipher incorporates the block cipher key length 210.

The target entropy 220 may specify a level of entropy that is supplied by the encryption cipher 215 for the encrypted data file 125. The cipher key 230 may record a key that may be used to encrypt and/or decrypt the encrypted data file 125.

Figure 4A:
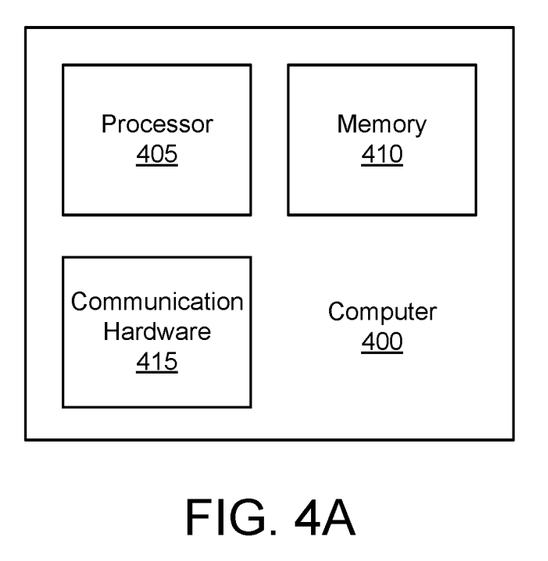
FIG. 4A is a schematic block diagram illustrating one embodiment of a computer.

FIG. 4A is a schematic block diagram illustrating one embodiment of a computer 400. The computer 400 may be included in the electronic device 110 and/or the server 105. In the depicted embodiment, the computer 400 includes a processor 405, the memory 410, and communication hardware 415. The memory 410 may comprise a semiconductor storage device, a hard disk drive, an optical storage device, or combinations thereof. The memory 410 may store code. The processor 405 may execute the code. The communication hardware 415 may communicate with other devices such as the network 115.

Figure 4B:
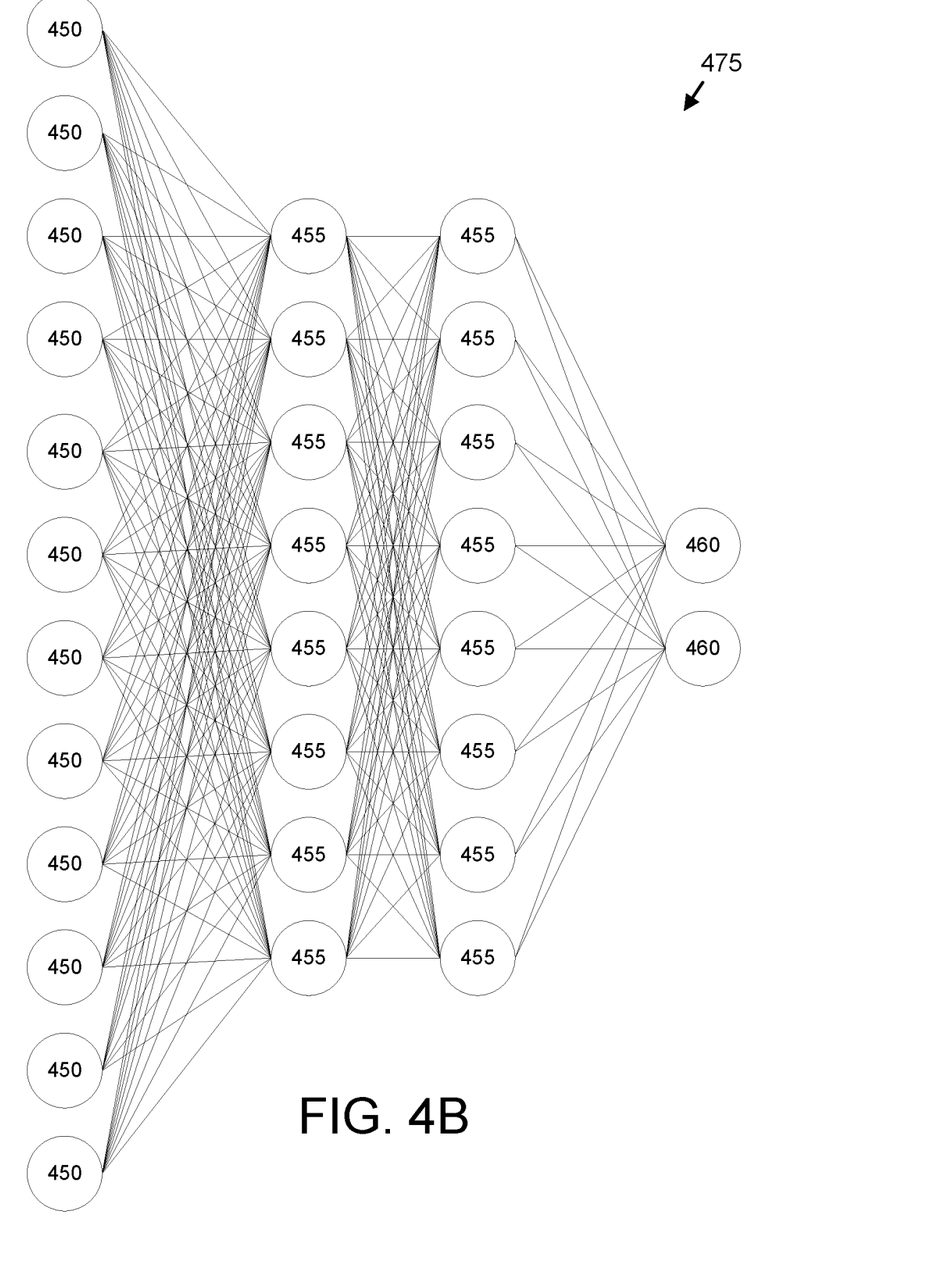
FIG. 4B is a schematic diagram illustrating one embodiment of a neural network.

FIG. 4B is a schematic diagram illustrating one embodiment of a neural network 475. The neural network 475 may be embodied in the encryption type model 160. In the depicted embodiment, the neural network 475 includes input neurons 450, hidden neurons 455, and output neurons 460. The neural network 475 may be organized as a convolutional neural network, a recurrent neural network, long-short-term memory network, and the like.

The neural network 475 may be trained with the training data 150 and/or the macroscopic artifacts data 170. The neural network 475 may be trained with supervised data and/or unsupervised data. The neural network 475 may be further trained using one or more learning functions while applying the training data 150 and/or macroscopic artifacts data 170 to the input neurons 450, including known result values for the output neurons 460. Subsequently, the neural network 475 may receive actual data such as encrypted data files 125 and/or macroscopic artifacts 225 at the input neurons 450 and make predictions of the data type 130 at the output neurons 460.

The neural network 475 and/or encryption type model 160 may be trained on relatively low resolution, unencrypted data files 120 to recognize patterns in the data files 120 and data types 130. These patterns are of the same type and granularity that exist in block ciphered data and can be picked out without training the neural network 475 with encrypted data files. 125 For example, the neural network 475 and/or encryption type model 160 may determine that a picture is of a dog would work on a data file 120 that obscured the dog's breed.

Figure 5A:
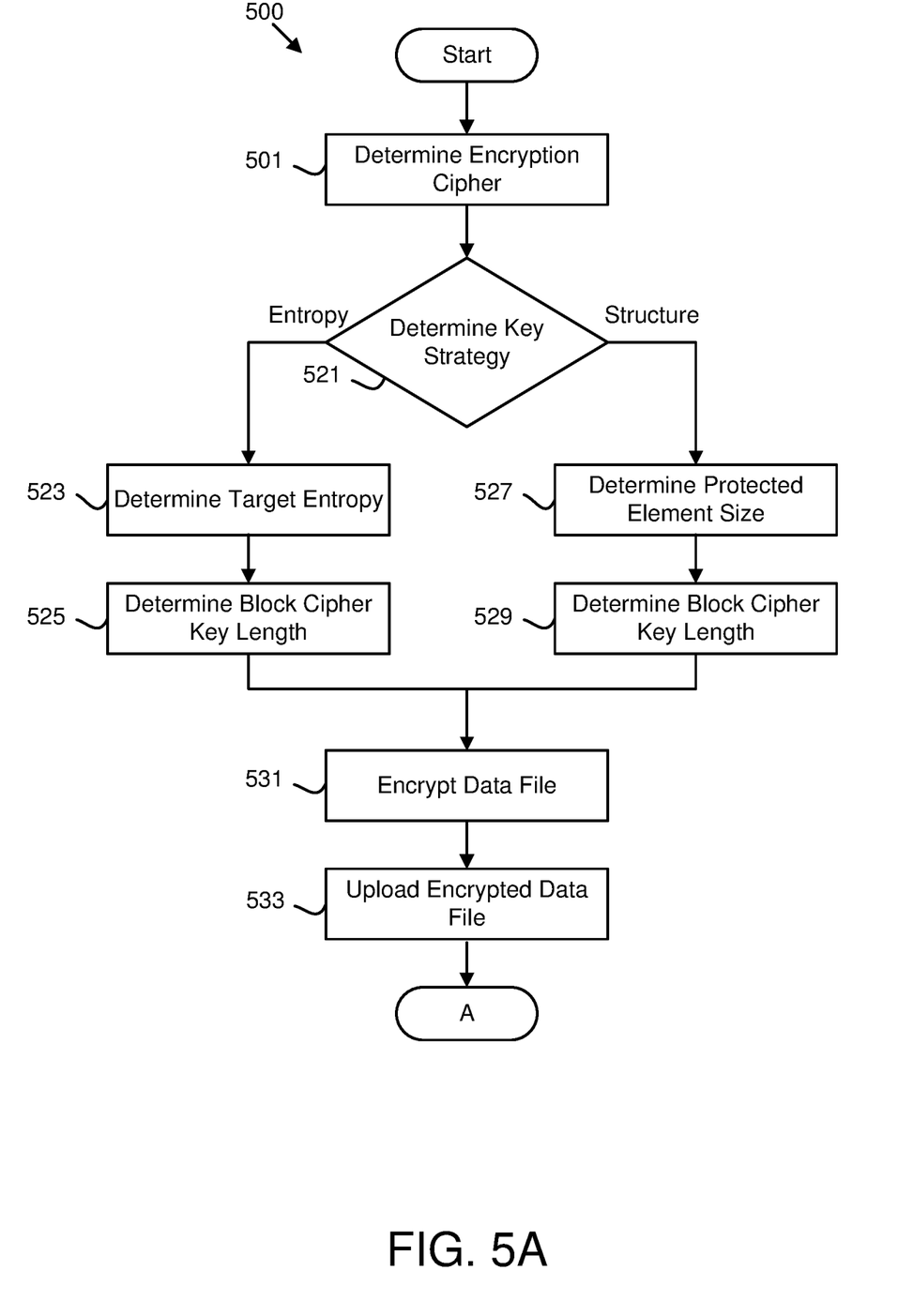
FIGS. 5A-B is a schematic flow chart diagram illustrating one embodiment of a categorization method.
Figure 5B:
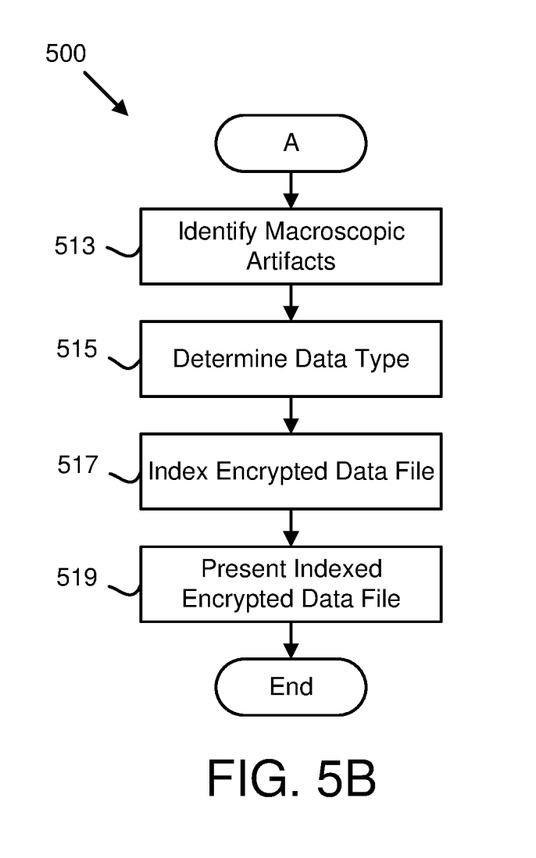

FIGS. 5A-B is a schematic flow chart diagram illustrating one embodiment of a categorization method 500. The method 500 may determine the data type 130 for an encrypted data file 125. In addition, the method 500 may index the encrypted data files 125 for searching and/or categorization. The method 500 may be performed by the system 100, the computer 400, and/or the processor 405.

The method 500 starts, and in one embodiment, the processor 405 may determine 501 the encryption cipher 215 for a data file 120. The encryption cipher 215 may be determined 501 based on the protected element size 209. In addition, the encryption cipher 215 based on an encryption parameter such as a standard encryption cipher 215.

The processor 405 determines 521 a key strategy. The key strategy may be one of an entropy key strategy and a structure key strategy. The key strategy may be determined in response to the encryption cipher 215. For example, the entropy key strategy may be selected for AES encryption. The structure key strategy may be selected if a protected element size 209 is known.

If the entropy key strategy is determined 521, the processor 405 determines 523 a target entropy 220. The processor 405 may determine 551 a target entropy 220 based on the data file length 205. In one embodiment, the target entropy TE 220 is calculated using Equation 1, where FL is the data file length 205, and m is a nonzero constant.

$$TE = m\sqrt{(FL)} \quad \text{Equation 1}$$

The processor 405 further determines 525 the block cipher key length 210 for the data file 120. The block cipher key length 210 may be based on the data file contents 207 and/or the data file length 205. In one embodiment, the block cipher key length 210 is less than three orders of magnitude of the data file length 205. In addition, the block cipher key length 210 may have a minimum length sufficient to obscure data in the data file 120 for the data type 130.

In one embodiment, the block cipher key length KL 210 is calculated using Equation 2, where FL is the data file length 205, M is a minimum block cipher key length 210, and k is a nonzero constant. In one embodiment, M may be a function of available computational power.

$$KL = \text{MIN}(k*FL/1000, M) \quad \text{Equation 2}$$

In one embodiment, k is calculated using Equation 3, wherein DE is a length of a largest data element to be hidden by encryption such as the protected element size 209.

$$k = \text{MAX}(DE*3, M) \quad \text{Equation 3}$$

In one embodiment, the method 500 is only performed if the block cipher key length 210 is all of long enough to protect the secrets of the data file 120, short enough to preserve macroscopic patterns and/or macroscopic artifacts 225, and sufficient to support strong encryption of the data file 120.

If the structure key strategy is determined 521, the processor 405 determines 527 the protected element size 209. The processor 405 further determines 529 the block cipher key length 210 for the data file 120. The block cipher key length 210 may be based on the protected element size 209. The block cipher key length 210 may be one or more of long enough to protect the secrets of an element of the protected element size 209 of the element, short enough to preserve macroscopic patterns and/or macroscopic artifacts 225 of the element, and sufficient to support strong encryption of the element.

Because the block cipher key length 210 is determined based on the protected element size 209 of the data file 120, the encryption cipher 215 preserves the macroscopic artifacts 225 in the encrypted data file 125 while still protecting the data of the encrypted data file 125. As a result, the data type 130 may be determined for the encrypted data file 125 without compromising the security of the data stored in the encrypted data file 125.

The processor 405 may encrypt 531 the data file 120 with the encryption cipher 215. The data file 120 may be encrypted 531 using the cipher key 230 with the block cipher key length 210. The data file 120 may be encrypted 531 at the electronic device 110. In addition, the data file 120 may be encrypted 507 at the server 105. In one embodiment, the server 105 has no access to the cipher key 230. In a certain embodiment, the electronic device 110 has no access to the cipher key 230.

The processor 405 may upload 533 the encrypted data file 125 to the server 105. In an alternate embodiment, the processor 405 uploads 533 the data file 120 to the server 105 and the server 105 encrypts 507 the data file 120 as the encrypted data file 125.

In one embodiment, the processor 405 identifies 513 the macroscopic artifacts 225 and/or macroscopic artifacts data 170 by generating one or more composite macroscopic artifacts 225 from a plurality of encrypted data files 125 and corresponding data types 130. For example, the processor 405 may identify commonalities between a plurality of encrypted data files 125 with the same data type 130. The commonalities may be recorded as the macroscopic artifacts 225 for the data type 130.

The processor 405 may determine 515 the data type 130 for the encrypted data file 125 from the macroscopic artifacts 225 of the encrypted data file 125. The data type 130 may be determined 515 using the encryption type model 160 trained on the training data 150 comprising a plurality of encrypted data files 125 and corresponding data types 130. For example, the processor 405 may present the encrypted data file 125 to the encryption type model 160 and/or neural network 475 and received the data type 130 from the encryption type model 160 and/or neural network 475.

In one embodiment, the processor 405 determines 515 the data type 130 by identifying the macroscopic artifacts 225 from a pattern search of an encrypted data file 125 and selecting the data type 130 that corresponds to the macroscopic artifacts 225. For example, the processor 405 may perform the pattern search that compares macroscopic artifacts 225 of the encrypted data file 125 with the macroscopic artifacts 225 of the macroscopic artifacts data 170. The processor may select the data type 130 of the macroscopic artifact 225 from the macroscopic artifacts data 170 that most closely matches the macroscopic artifacts 225 of the encrypted data file 125.

In one embodiment, the data type 130 is determined 515 without access to the cipher key 230 of the encryption cipher 215. For example, the server 105 may determine 515 the data type 130 although the server 105 has no access to the cipher key 230. Thus the encrypted data files 125 may be securely stored on the server 105 while the server is still able to determine 515 the data types 130 for the encrypted data files 125. As a result, the efficiency of the server 105 is enhanced.

The processor 405 may index 517 one or more of the encrypted data file 125 based on the data types 130. For example, the processor 405 may index and/or categorize 517 the encrypted data files 125 into one or more categories. The categories may include images, video, documents, and/or audio. In addition, subcategories within each category may be indexed and/or categorized 517. For example, images may be indexed and/or categorized 517 in subcategories including people, objects, and/or landscapes.

In one embodiment, the processor 405 indexes 517 duplicate encrypted data files 125. The processor 405 may further index 517 a total size of the encrypted data files 125 based on the data types 130.

The processor 405 may present 519 a plurality of indexed encrypted data files 125 that are organized based on the indexing and the method 500 ends. For example, the processor 405 may present 519 a list of image encrypted data files 125 that are stored for the electronic device 105 on the server 105. As a result, the user may determine the number of images stored on the server 105. Similarly, the processor 405 may present 519 a total size of the audio encrypted data files 125 so that the server 105 may select an appropriate encryption algorithm.

Figure 5C:
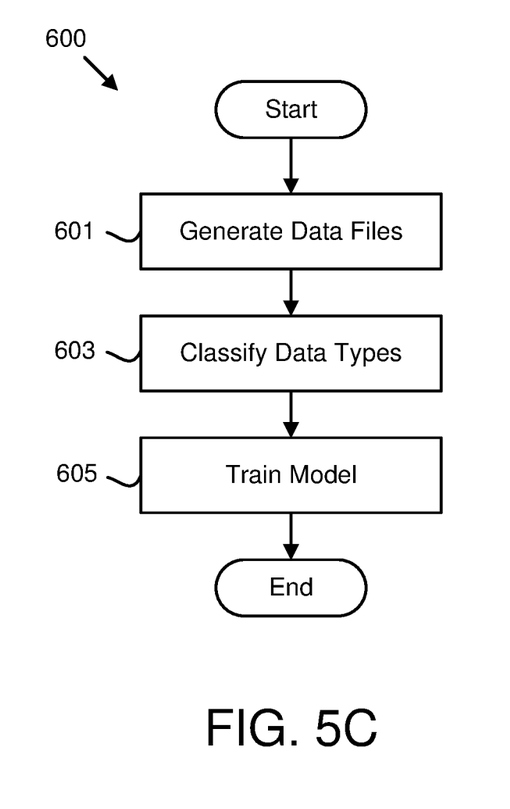
FIG. 5C is a schematic flow chart diagram illustrating one embodiment of model training method.

FIG. 5C is a schematic flow chart diagram illustrating one embodiment of model training method 600. The method 600 may train the encryption type model 160. The method 600 may be performed by the system 100, the computer 400, and/or the processor 405.

The method 600 starts, and in one embodiment, the processor 405 generates 601 a plurality of data files 120 and/or encrypted data files 125. The plurality of data files 120 and/or encrypted data files 125 may be representative of encrypted data files 125 that are stored by the server 105.

The processor 405 further classifies 603 the data type 130 for the plurality of data files 120 and/or encrypted data files 125. The data type 130 may be classified 603 based on the file type, a file content class, and/or an image class of the data file 120. In addition, the data type 130 may be classified based on the data file length 205, the data file contents 207, and/or the protected elements size 209 for each data file 120 and/or encrypted data file 125. The processor 405 may classify 603 the data type 130 for an encrypted data file 125 from the macroscopic artifacts 225 of the encrypted data file 125.

In one embodiment, the training data 150 is prepared from a plurality of data files 120. The data type 130 for each data file 120 may be identified by the processor 405. The processor 405 may further encrypt each data file 120 as an encrypted data file 125. The processor 405 may associate each data file 120 and/or encrypted data file 125 with the corresponding data type 130 of the parent data file 120.

In one embodiment, the processor 405 trains 607 the encryption type model 160 and the method 600 ends. The encryption type model 160 may include the neural network 475. The processor 405 may present a plurality of unencrypted data files 120 and/or encrypted data files 125 and corresponding data types 130 to the neural network 475 to train the neural network 475 and/or encryption type model 160.

The embodiments determine the blocks cipher key length 210 for a data file 120 and encrypt the data file 120 using the block cipher key length 210. As a result, macroscopic artifacts 225 persist in the encrypted data file 125 that are used to determine the data type 130 for the encrypted data file 125. By determining the data type 130 for the encrypted data files 125, the encrypted data files 125 may be categorized, indexed, and/or searched based on the data type 130. Thus the efficiency and utility of the computer 400 of the server 105 and/or electronic device 110 is enhanced.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a processor;
a memory that stores code executable by the processor to:
receive an encrypted data file comprising encrypted data, the encrypted data file being encrypted with an encrypted cipher using block cipher key length selected to preserve macroscopic artifacts of the data file contents from an encrypted form of the data file, the macroscopic artifacts sufficient to identify a file type of the encrypted data file from encrypted data in the encrypted data file, the file type comprising a category of the encrypted data file; and
determine a data type for the encrypted data file from macroscopic artifacts from the encrypted data of the encrypted data file,
wherein the data type comprises a file type, a file content class, and/or an image class.

2. The apparatus of claim 1, wherein the code is further executable by the processor to index the encrypted data file based on the data type and present a plurality of indexed encrypted data files that are organized based on the indexing.

3. The apparatus of claim 2, wherein:
the encrypted data files are indexed into an image category, a video category, a document category, or an audio category; and
the image category includes a people category, an object category, or a landscape category.

4. The apparatus of claim 1, wherein the data type is determined by an encryption type model trained on training data comprising a plurality of encrypted and/or unencrypted data files and corresponding data types.

5. The apparatus of claim 1, wherein the data type is determined by identifying the macroscopic artifacts from a pattern search of the encrypted data of the encrypted data file and selecting the data type that corresponds to the macroscopic artifact.

6. The apparatus of claim 1, wherein the block cipher key length is less than three orders of magnitude of a data file length of the data file.

7. The apparatus of claim 1, wherein the block cipher key length has a minimum length sufficient to obscure data in the data file for the data type.

8. The apparatus of claim 1, wherein the data type is determined without access to a cipher key of the encryption cipher.

9. A method comprising:
receiving, by use of a processor, an encrypted data file comprising encrypted data, the encrypted data file being encrypted with an encrypted cipher using a block cipher key length selected to preserve macroscopic artifacts of the data file contents from an encrypted form of the encrypted data file, the macroscopic artifacts sufficient to identify a file type of the data file from encrypted data in the encrypted data file, the file type comprising a category of the encrypted data file; and
determining a data type for the encrypted data file from macroscopic artifacts from the encrypted data of the encrypted data file,
wherein the data type comprises a file type, a file content class, and/or an image class.

10. The method of claim 9, the method further comprising indexing the encrypted data file based on the data type.

11. The method of claim 10, wherein:
the encrypted data files are indexed into an image category, a video category, a document category, or an audio category; and
the image category includes a people category, an object category, or a landscape category.

12. The method of claim 10, the method further comprising presenting a plurality of indexed encrypted data files that are organized based on the indexing.

13. The method of claim 9, wherein the data type is determined by an encryption type model trained on training data comprising a plurality of encrypted and/or unencrypted data files and corresponding data types.

14. The method of claim 9, wherein the data type is determined by identifying the macroscopic artifacts from a pattern search of the encrypted data of the encrypted data file and selecting the data type that corresponds to the macroscopic artifact.

15. The method of claim 9, wherein the block cipher key length is less than three orders of magnitude of a data file length of the data file.

16. The method of claim 9, wherein the block cipher key length has a minimum length sufficient to obscure data in the data file for the data type.

17. The method of claim 9, wherein the data type is determined without access to a cipher key of the encryption cipher.

18. A program product comprising a non-transitory computer readable storage medium that stores code executable by a processor, the executable code comprising code to:
receive an encrypted data file comprising encrypted data, the encrypted data file being encrypted with an encrypted cipher using a block cipher key length selected to preserve macroscopic artifacts of the encrypted data file contents from an encrypted form of the data file, the macroscopic artifacts sufficient to identify a file type of the data file from encrypted data in the encrypted data file, the file type comprising a category of the encrypted data file;
and
determine a data type for the encrypted data file from macroscopic artifacts from the encrypted data of the encrypted data file,
wherein the data type comprises a file type, a file content class, and/or an image class.

19. The program product of claim 18, wherein the data type is determined by an encryption type model trained on training data comprising a plurality of encrypted and/or unencrypted data files and corresponding data types.

20. The program product of claim 18, wherein the data type is determined by identifying the macroscopic artifacts from a pattern search of the encrypted data of the encrypted data file and selecting the data type that corresponds to the macroscopic artifact.

* * * * *